United States Patent
Moniot et al.

(10) Patent No.: US 6,622,186 B1
(45) Date of Patent: Sep. 16, 2003

(54) BUFFER ASSOCIATED WITH MULTIPLE DATA COMMUNICATION CHANNELS

(75) Inventors: Pascal Moniot, Bernin (FR); Marcello Coppola, Moirans (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/466,508

(22) Filed: Dec. 17, 1999

(30) Foreign Application Priority Data

Dec. 17, 1998 (FR) .......................... 98 16156

(51) Int. Cl.⁷ ............................................. G06F 13/00
(52) U.S. Cl. ............................. 710/52; 710/1; 710/3; 710/5; 710/33; 710/35; 710/53; 710/54; 710/55; 710/56; 710/57
(58) Field of Search ............................. 710/1, 3, 5, 33, 710/35, 52, 53, 54, 55, 56, 57

(56) References Cited

U.S. PATENT DOCUMENTS

| | | | |
|---|---|---|---|
| 5,483,671 A | * 1/1996 | Helm et al. | 455/503 |
| 5,828,835 A | 10/1998 | Isfeld et al. | |
| 5,892,979 A | * 4/1999 | Shiraki et al. | 710/52 |
| 5,982,700 A | * 11/1999 | Proebsting | 365/230.05 |
| 6,075,745 A | * 6/2000 | Gould et al. | 365/230.03 |
| 6,216,205 B1 | * 4/2001 | Chin et al. | 711/131 |
| 6,247,095 B1 | * 6/2001 | Knudsen | 711/100 |

FOREIGN PATENT DOCUMENTS

WO    WO 98/36357    8/1998

OTHER PUBLICATIONS

Stanley, T.J. et al., "A Performance Analysis of Automatically Managed Top of Stack Buffers", Proceedings of the Annual International Symposium of Computer Architecture, Pittsburgh, Jun. 2, 1987, XP002032257, pp. 272–281.

French Search Report dated Sep. 28, 1999 with Annex to French Application No. 98 16156.

* cited by examiner

*Primary Examiner*—Jeffrey Gaffin
*Assistant Examiner*—Mohammad O. Farooq
(74) *Attorney, Agent, or Firm*—Lisa K. Jorgenson; Stephen Bongini; Fleit, Kain, Gibbons, Gutman & Bongini P.L.

(57) ABSTRACT

A buffer for adapting data flows from input channels to output channels is provided. The buffer includes a DRAM organized in blocks and a memory controller for managing assignment of the blocks to the chains of linked blocks. The DRAM contains, as a chain of linked blocks, data associated with each communication channel formed by a pair of input and output channels, and also contains a main queue of free blocks for listing unoccupied blocks. The memory controller includes a cache memory containing a partial queue of free blocks that the memory controller uses in managing block assignment. According to one embodiment, when a level of the partial queue reaches a predetermined minimum limit the cache memory is at least partially filled by a burst from the main queue, and when a level of the partial queue reaches a predetermined maximum limit the cache memory is at least partially emptied by a burst into the main queue. According to another embodiment, the partial queue stores a local image of a top portion of the main queue, and the memory controller exclusively uses the partial queue in assigning blocks to the chains of linked blocks. Further embodiments of the present invention provide methods of managing a buffer.

23 Claims, 2 Drawing Sheets

BUFFER ASSOCIATED WITH MULTIPLE DATA COMMUNICATION CHANNELS

CROSS-REFERENCE TO RELATED APPLICATIONS

This application is based upon and claims priority from prior French Patent Application No. 98-16156, filed Dec. 17, 1998, the entire disclosure of which is herein incorporated by reference.

BACKGROUND OF THE INVENTION

1. Field of the Invention

The present invention relates to electronic systems, and more specifically to a buffer for adapting the data flows exchanged between multiple communication channels.

2. Description of Related Art

An input channel and one or more output channels forming a communication channel are generally asynchronously processed intermittently, so that the input channel often provides data while the output channel is not ready to receive it, or conversely, the output channel is ready to receive data while the input channel provides none. It is thus necessary to adapt the data flows of these channels, which is generally done by using a buffer. The buffer stores any excess data that the output channel cannot accept at a given time and provides the data to the output channel when the channel becomes available.

FIG. 1 illustrates a buffer for adapting the flows of multiple input channels to multiple respective output channels. It can be, for example, a multi-protocol switch for switching multiple ATM connections on multiple Ethernet links. The buffer includes a DRAM 10 which, in high rate applications, is generally a synchronous DRAM (SDRAM). Memory 10 is managed by a memory controller 12 which processes the data exchanged between the ATM connections and the Ethernet links via adequate interfaces 14.

One way of adapting the flows of multiple communication channels is to dedicate an area of fixed size in SDRAM 10 to each possible communication channel. This solution is far from being optimal from the point of view of the memory use, since a seldom required dedicated area cannot be used to relieve a very frequently required dedicated area. Thus, dedicated areas must be of maximum size to fulfill possible maximum requirements, although this maximum size will most often not be used. Further, in a switch, the number of open communication channels is variable, and they are practically never all in use at the same time. The areas dedicated to the non-open channels remain empty but are unusable for other channels.

FIG. 2 illustrates another solution for providing a buffer function to each of several possible communication channels. As illustrated, SDRAM 10 is organized in small blocks 16 of fixed size which are dedicated one by one to each communication channel according to needs. More specifically, each communication channel is associated with a chain of linked blocks 16 containing the data waiting for the corresponding output channel, with the chain forming a buffer of variable size. The blocks left free and not assigned to communication channels are listed in a queue of free blocks 18 also contained in memory 10.

To manage this memory organization, memory controller 12 includes, for each possible communication channel, two pointers wbptr and W for the input channel, and two pointers rbptr and R for the output channel. Pointer wbptr points to the last block of the chain, that is, the block which is being filled. Pointer W points to the current writing location of this last block. Pointer rbptr points to the first block of the chain, that is, the block which is being emptied. Pointer R points to the current reading location of this first block. Further, controller 12 includes registers to enable managing of the queue of free blocks 18. Queue 18 may be of the LIFO type (as shown), in which case one register containing a pointer "top" to the top of queue 18 is enough.

Initially, free block queue 18 is full, which signifies that all the blocks of SDRAM 10 are free and can be dedicated to communication channels. When a communication channel is opened, the free block found at the top of queue 18, as indicated by pointer "top", is dedicated thereto. Pointer "top" is decremented by one unit and the pointers wbptr and rbptr associated with the communication channel are both reset to point to the block just dedicated. At this time, pointers W and R point to the first element to be read from or mitten into the block. After writing a word into the block at the location indicated by pointer W, pointer W is incremented by one unit.

When the last location of the current block is reached by pointer W, a new block taken from the top of queue 18 at the location indicated by pointer "top" is dedicated to the communication channel. Pointer "top" is decremented by one unit, pointer wbptr is updated to point to the new block, pointer W is updated to point to the first location of the new block, and a descriptor of the block just filled is updated to chain to the new block. Thus, if the buffer needs for a communication channel increase, an increasing number of blocks can be used to form a chain, the length of which can increase to occupy the entire SDRAM or at least the entire space left free by the concurrent communication channels, if necessary.

The data to be sent to the output channel is read at the location indicated by pointer R in the block indicated by pointer rbptr. Upon each reading of a word, pointer R is incremented by one unit. When pointer R reaches the last location, pointer rbptr is updated to point to the next block of the chain. Pointer R is updated to point to the first datum to be transmitted in this block. The freed block is inscribed at the top of queue 18, at location top+1. Pointer "top" is then incremented by one unit. Thus, as blocks are freed in a chain associated with a communication channel, these blocks become immediately available to all communication channels.

A problem which arises with such a memory organization is that a single immediate access to free block queue 18 is required. This is particularly impairing in access time when an SDRAM is used, because a minimal access to an SDRAM costs 8 clock cycles, only a single cycle of which is necessary for reading or writing a word. More specifically, there are three preload cycles, three addressing cycles, a read or write cycle, and a stop cycle. Further, free block queue 18 cannot be integrated in controller 12 as a memory accessible in a single cycle, because this queue is generally of too large a size for such an integration to be reasonable.

SUMMARY OF THE INVENTION

In view of these drawbacks, it is an object of the present invention to overcome the above-mentioned drawbacks and to provide a memory organization for a buffer that optimizes the accesses to a queue of free blocks contained in a DRAM with an access latency.

Another object of the present invention is to provide a method of managing a buffer for adapting the flows of multiple input channels to multiple respective output channels.

One embodiment of the present invention provides a buffer for adapting data flows from input channels to output channels. The buffer includes a DRAM organized in blocks and a memory controller for managing assignment of the blocks to the chains of linked blocks. The DRAM contains, as a chain of linked blocks, data associated with each communication channel formed by a pair of input and output channels, and also contains a main queue of free blocks for listing unoccupied blocks. The memory controller includes a cache memory containing a partial queue of free blocks that the memory controller uses in managing block assignment. According to one embodiment, when a level of the partial queue reaches a predetermined minimum limit the cache memory is at least partially filled by a burst from the main queue, and when a level of the partial queue reaches a predetermined maximum limit the cache memory is at least partially emptied by a burst into the main queue. According to another embodiment, the partial queue stores a local image of a top portion of the main queue, and the memory controller exclusively uses the partial queue in assigning blocks to the chains of linked blocks.

Another embodiment of the present invention provides a method of managing a buffer for adapting data flows from input channels to output channels. According to the method, first elements are initially transferred from a main queue of free blocks to a cache memory and corresponding access pointers of the cache memory and the main queue are updated. A free block is assigned by taking it from the cache memory while decrementing the cache memory access pointer, and a block is freed by putting it in the cache memory while incrementing the cache memory access pointer.

Yet another embodiment of the present invention provides a method of managing a buffer for adapting data flows from input channels to output channels. According to the method, first elements are initially transferred from a main queue of free blocks to a cache memory and corresponding access pointers of the cache memory and the main queue are updated. When the cache memory access pointer reaches a predetermined minimum limit, the next elements of the main queue are transferred to the cache memory in a burst, so as to at least partially fill the cache memory. Additionally, when the cache memory access pointer reaches a predetermined maximum limit, the cache memory is at least partially emptied into the main queue by a burst.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
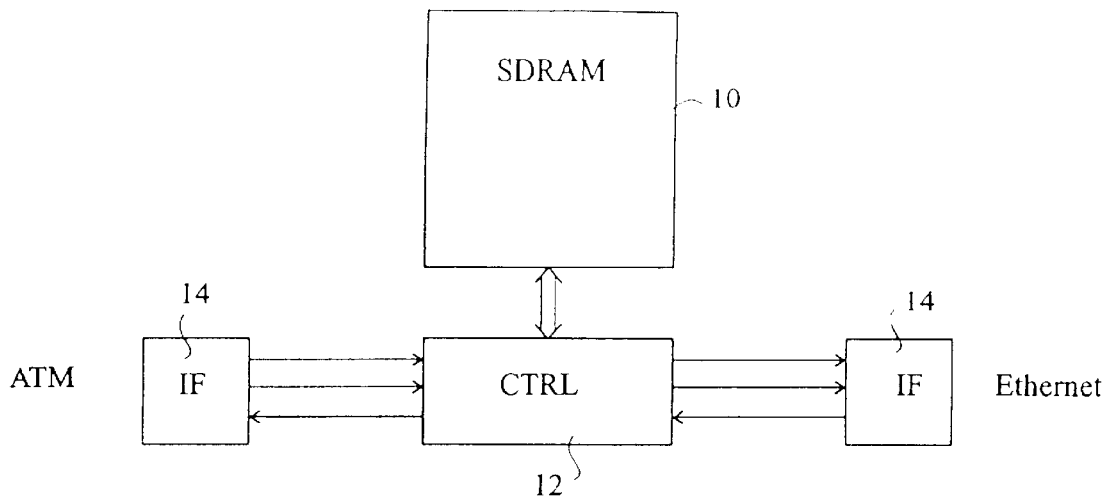
FIG. 1 is a block diagram showing a buffer for adapting the flows of multiple input channels to multiple respective output channels.
Figure 2:
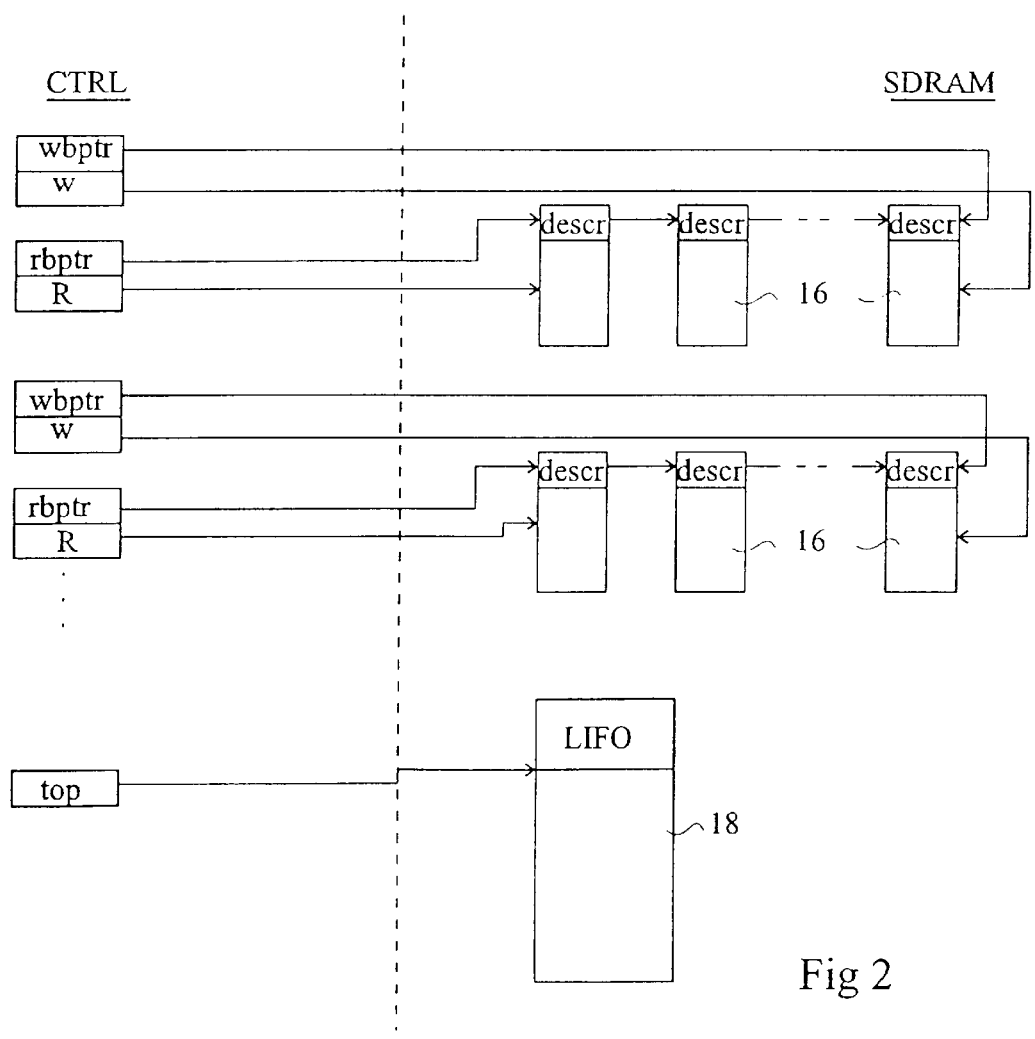
FIG. 2 is a block diagram showing a memory organization of a buffer of the type shown in FIG. 1 that optimizes memory use.
Figure 3:
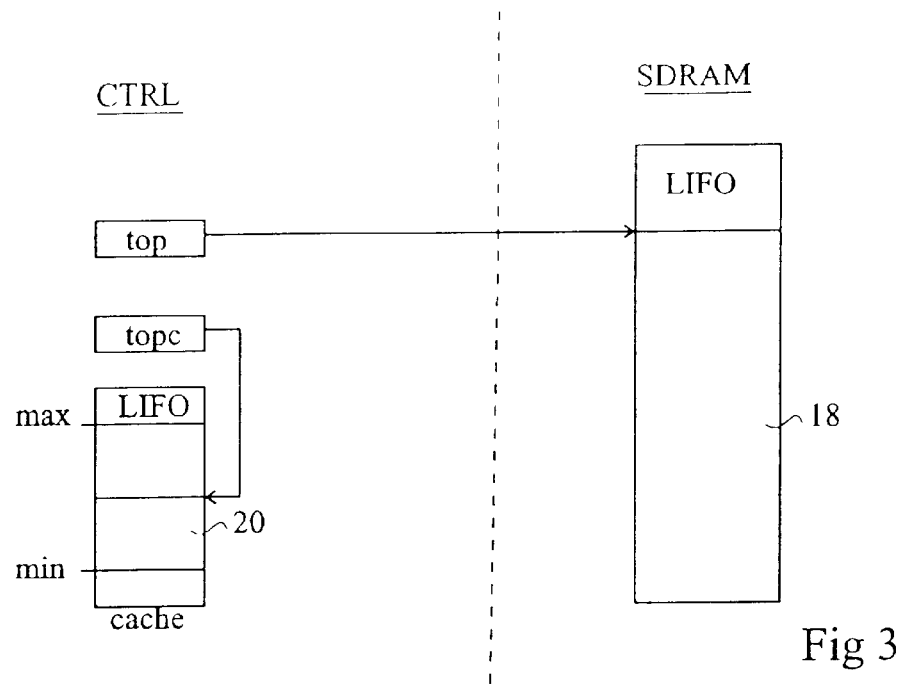
FIG. 3 is a block diagram showing a memory organization according to a preferred embodiment of the present invention for optimizing accesses to a free block queue contained in a DRAM.

FIG. 3 shows a memory organization according to a preferred embodiment of the present invention to optimize accesses to the free block queue 18 contained in the SDRAM 10, which is organized in accordance with FIG. 2. A cache memory 20, which is managed in a specific way, is provided in the controller CTRL 12. Cache memory 20 provides a partial local image of the top of free block queue 18. The controller takes exclusively from cache memory 20 the blocks to be dedicated to a communication channel and inscribes exclusively therein the blocks which are freed.

When cache memory 20 is too full, it is partially emptied in a single burst to the top of queue 18. Conversely, when cache memory 20 is practically empty, it is partially filled in a single burst from the top of queue 18. Thus, each access to free block queue 18 is performed in a burst, which all the more reduces the average number of cycles for accessing a word as the size of the burst is large. In specific embodiments, the burst size depends on the size of the cache memory used. In practice, cache memory 20 is preferably of small size, so as to be compatible with integration into memory controller 12. Generally, such integrated memories provide accesses of a single cycle per word, which increases performance by a factor 10 with respect to the case where the words of SDRAM queue 18 must be accessed one by one.

Further, cache memory 20 enables a considerable decrease in the number of accesses to queue 18. Indeed, during the opening of a communication channel, as soon as a block is freed, it can be dedicated to the same communication channel. This is also true for multiple communication channels that are open at the same time. When one of the channels frees a block, the block can immediately be dedicated to any channel, including that which has just freed it. In other words, the same blocks are used in the cache memory, and thus the filling level of the cache memory oscillates around a fixed average value. In fact, the cache memory requires filling or emptying only when a configuration change linked to the number of connections or to the flow occurs.

Figures 4A, 4B:
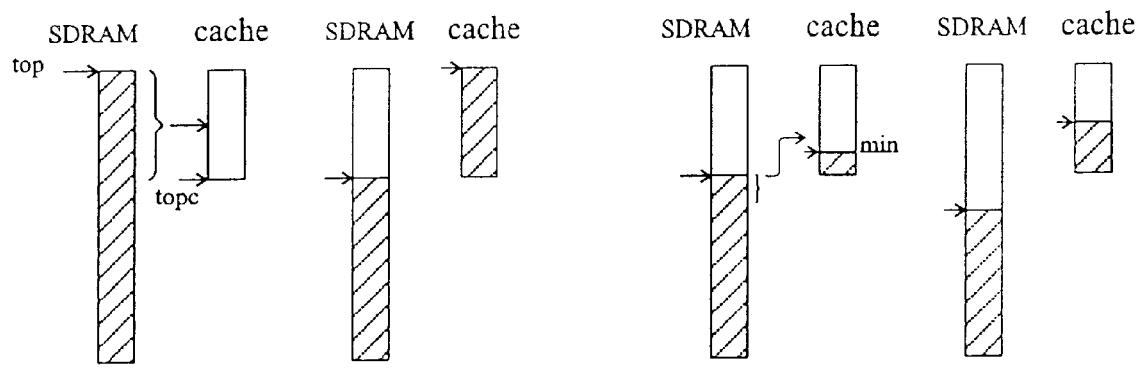
FIGS. 4A to 4C illustrate the operation of the organization of FIG. 3.
Figure 4C:
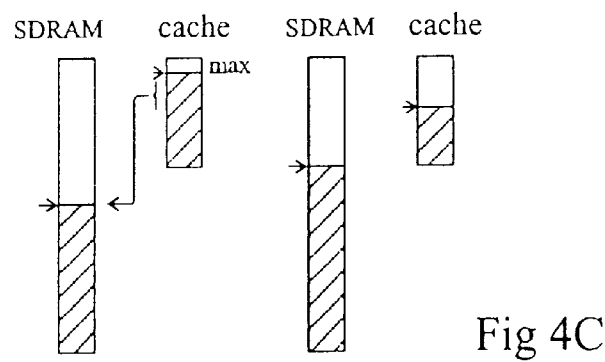

As illustrated, cache memory 20 is preferably of the LIFO type. To manage this type of cache memory, controller 12 includes a register including a pointer "topc" to the top of cache memory 20. When pointer "topc" reaches a maximum limit max, part of the content of cache memory 20 is transferred by burst to queue 18. In the opposite case, if pointer topc reaches a minimum limit min, part of the content of queue 18 is transferred by burst to the cache memory. FIGS. 4A to 4C illustrate this operation in further detail.

FIG. 4A illustrates a setting of the system, for example, upon power-on. Free block queue 18 is full and cache memory 20 is empty. Pointer "top" of the main queue is at its maximum value while pointer "topc" of the cache memory is at its minimum value. The cache memory is immediately completely filled, in one burst, by the elements at the top of main queue 18. Pointer "top" of queue 18 is decremented by the size of the burst while pointer "topc" of the cache memory is set to its maximum value. From this time on, communication channels can open. Each time a block is required, it is taken from the cache memory and pointer "topc" is decremented by one unit. The assigning of the blocks to the communication channels is performed as described above in relation to FIG. 2.

In FIG. 4B, the need for blocks is so great that pointer "topc" of the cache memory reaches the minimum limit. The elements at the top of queue 18 are then transferred by burst into the cache memory, to fill the cache memory, for example, halfway. Pointer "top" of main queue 18 is decremented by the burst size while pointer "topc" of the cache memory is incremented by the burst size. When a communication channel frees a block, the block is immediately inscribed at the top of the cache memory at location topc+1, and pointer "topc" is incremented by one unit. The freeing of blocks is performed as described above in relation to FIG. 2.

In FIG. 4C, so many blocks have been freed that pointer "topc" reaches the maximum limit. The elements at the top of the cache memory are then transferred by burst to the top of queue 18. The burst size is chosen, for example, to have the cache memory filled halfway after the transfer. Pointer "topc" of the cache memory is decremented by the burst size while pointer "top" of queue 18 is incremented by the burst size.

As indicated above, in the steady state, the number of open communication channels varies little or slowly around an average value so that the minimum and maximum limits are seldom reached. This results in infrequent transfers between the cache memory and SDRAM queue 18. As an example of one specific embodiment, for a switch able to manage 1024 communication channels with a maximum general bidirectional flowrate of 155 megabits per second, an SDRAM organized in blocks of 0.5 kilobytes is used. A cache memory of 32 elements is then used, the maximum and minimum limits being set, for example, to the 28 and 4 locations, respectively. Bursts of 8 words are used to fill or empty the cache memory when the limits are reached.

The embodiments described above use a cache memory and a free block queue organized in queues of the LIFO type, because such an organization is preferred since it requires managing a single pointer. However, in further embodiments, these queues may be replaced with FIFO queues, in which case two pointers have to be managed (i.e., one pointing to the current write location and the other pointing to the current read location).

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A buffer for adapting data flows from input channels to output channels, said buffer comprising:

a DRAM organized in blocks, the DRAM containing, as a chain of linked blocks, data associated with each communication channel formed by a pair of input and output channels, the DRAM also containing a main queue of free blocks for listing unoccupied blocks; and a memory controller for managing assignment of the blocks to the chains of linked blocks, the memory controller including a cache memory containing a partial queue of free blocks that the memory controller uses in managing block assignment, wherein when a level of the partial queue reaches a predetermined minimum limit, the cache memory is at least partially filled by a burst from the main queue, and when a level of the partial queue reaches a predetermined maximum limit, the cache memory is at least partially emptied by a burst into the main queue.

2. The buffer of claim 1, wherein the DRAM is organized in blocks of fixed size.

3. The buffer of claim 1, wherein the memory controller exclusively uses the partial queue in assigning the blocks to the chains of linked blocks.

4. The buffer of claim 1, wherein each input channel is associated with a pointer to a current write block in which is written the data coming from the input channel, and each output channel is associated with a pointer to a current read block from which is read the data to be provided by the output channel.

5. The buffer of claim 4, wherein a previously-filled block contains a pointer to the current write block to form a chain of linked blocks that have been consecutively filled, and the current read block is the last block of the chain associated with the input channel.

6. The buffer of claim 1, wherein the DRAM is an SDRAM.

7. The buffer of claim 1, wherein the cache memory and the main queue are organized as LIFO queues.

8. A buffer for adapting data flows from input channels to output channels, said buffer comprising:

a DRAM organized in blocks, the DRAM containing, as a chain of linked blocks, data associated with each communication channel formed by a pair of input and output channels, the DRAM also containing a main queue of free blocks for listing unoccupied blocks; and a memory controller for managing assignment of the blocks to the chains of linked blocks, the memory controller including a cache memory containing a partial queue of free blocks, wherein the partial queue stores a local image of a top portion of the main queue, and the memory controller exclusively uses the partial queue in assigning blocks to the chains of linked blocks.

9. The buffer of claim 8, wherein the DRAM is organized in blocks of fixed size.

10. The buffer of claim 9, wherein the DRAM is an SDRAM, and the cache memory and the main queue are organized as LIFO queues.

11. The buffer of claim 8, wherein each input channel is associated with a pointer to a current write block in which is written the data coming from the input channel, and each output channel is associated with a pointer to a current read block from which is read the data to be provided by the output channel.

12. An information processing system including at least one buffer for adapting data flows from input channels to output channels, said buffer comprising:

a DRAM organized in blocks, the DRAM containing, as a chain of linked blocks, data associated with each communication channel formed by a pair of input and output channels, the DRAM also containing a main queue of free blocks for listing unoccupied blocks; and a memory controller for managing assignment of the blocks to the chains of linked blocks, the memory controller including a cache memory containing a partial queue of free blocks that the memory controller uses in managing block assignment, wherein when a level of the partial queue reaches a predetermined minimum limit, the cache memory is at least partially filled by a burst from the main queue, and when a level of the partial queue reaches a predetermined maximum limit, the cache memory is at least partially emptied by a burst into the main queue.

13. The information processing system of claim 12, wherein the DRAM is organized in blocks of fixed size.

14. The information processing system of claim 12, wherein the memory controller exclusively uses the partial queue in assigning the blocks to the chains of linked blocks.

15. The information processing system of claim 12,
wherein each input channel is associated with a pointer to a current write block in which is written the data coming from the input channel, and each output channel is associated with a pointer to a current read block from which is read the data to be provided by the output channel.

16. The information processing system of claim 15,
wherein a previously-filled block contains a pointer to the current write block to form a chain of linked blocks that have been consecutively filled, and the current read block is the last block of the chain associated with the input channel.

17. The buffer of claim 12, wherein the DRAM is an SDRAM, and the cache memory and the main queue are organized as LIFO queues.

18. A method of managing a buffer for adapting data flows from input channels to output channels, said method comprising the steps of:

initially transferring first elements from a main queue of free blocks to a cache memory and updating corresponding access pointers of the cache memory and the main queue;

assigning a free block by taking it from the cache memory while decrementing the cache memory access pointer; and freeing a block by putting it in the cache memory while incrementing the cache memory access pointer.

19. A method of managing a buffer for adapting data flows from input channels to output channels, said method comprising the steps of:

initially transferring first elements from a main queue of free blocks to a cache memory and updating corresponding access pointers of the cache memory and the main queue;

when the cache memory access pointer reaches a predetermined minimum limit, transferring the next elements of the main queue to the cache memory in a burst, so as to at least partially fill the cache memory; and when the cache memory access pointer reaches a predetermined maximum limit, at least partially emptying the cache memory into the main queue by a burst.

20. The method of claim 19, further comprising the steps of:

assigning a free block by taking it from the cache memory while decrementing the cache memory access pointer; and freeing a block by putting it in the cache memory while incrementing the cache memory access pointer.

21. The method of claim 20, wherein the assigning step is performed at least when a current write block is full, and includes the sub-steps of:

assigning a free block from the cache memory;

assigning a linking pointer from the current write block to the new block; and making the new block the current write block by modifying a current write block pointer.

22. The method of claim 21, wherein the freeing step is performed at least when a current read block is empty, and includes the sub-steps of:

putting the block in the cache memory; and updating a current read block pointer so as to point to a block pointed to by the linking pointer of the current read block.

23. The method of claim 19, wherein the cache memory and the main queue are organized as LIFO queues.

* * * * *